United States Patent
Luo et al.

(10) Patent No.: US 9,794,765 B2
(45) Date of Patent: Oct. 17, 2017

(54) WIRELESS LOCAL AREA NETWORK DISCOVERY METHOD, DEVICE, AND SYSTEM

(71) Applicant: Huawei Technologies Co., Ltd., Shenzhen, Guangdong (CN)

(72) Inventors: Haiyan Luo, Shanghai (CN); Tianle Deng, Shaghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 294 days.

(21) Appl. No.: 14/689,328

(22) Filed: Apr. 17, 2015

(65) Prior Publication Data
US 2015/0223049 A1    Aug. 6, 2015

Related U.S. Application Data

(63) Continuation of application No. PCT/CN2012/083131, filed on Oct. 18, 2012.

(51) Int. Cl.
*H04W 8/00* (2009.01)
*H04W 48/20* (2009.01)
(Continued)

(52) U.S. Cl.
CPC .......... *H04W 8/005* (2013.01); *H04W 48/16* (2013.01); *H04W 48/20* (2013.01); *H04W 84/12* (2013.01)

(58) Field of Classification Search
CPC ..... H04W 8/005; H04W 48/20; H04W 84/12; H04W 48/16
(Continued)

(56) References Cited

U.S. PATENT DOCUMENTS 6,580,704 B1 * 6/2003 Wellig .............. H04L 29/12009
370/338
2004/0259546 A1    12/2004 Balachandran et al.
(Continued)

FOREIGN PATENT DOCUMENTS

| CN | 101203024 A | 6/2008 |
| CN | 102256334 A | 11/2011 |
| JP | 2008066781 A | 3/2008 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.11.0, Jun. 2012, 256 pages.

*Primary Examiner* — Kan Yuen
*Assistant Examiner* — Richard Chang

(57) ABSTRACT

The present invention discloses a wireless local area network discovery method, a device, and a system. The method specifically includes: acquiring an access point (AP) identifier of an AP of a wireless local area network and a first measurement result that is obtained by a first user equipment UE, where the AP identifier is associated with the first measurement result; acquiring a second measurement result that is obtained by a second UE; and determining, according to the second measurement result and the first measurement result, whether the second UE is located within coverage of the AP. By using the technical solutions in embodiments of the present invention, it may be determined that the second UE is located within the coverage of the AP, and the AP is accurately accessed when it is necessary.

9 Claims, 10 Drawing Sheets

(51) Int. Cl.
*H04W 48/16* (2009.01)
*H04W 84/12* (2009.01)

(58) Field of Classification Search
USPC .......................................................... 370/254
See application file for complete search history.

(56) References Cited

U.S. PATENT DOCUMENTS

| | | |
|---|---|---|
| 2005/0078033 A1 | 4/2005 | Tamaki et al. |
| 2006/0035636 A1 | 2/2006 | Pirila |
| 2007/0019586 A1 | 1/2007 | Nanda et al. |
| 2008/0076430 A1 | 3/2008 | Olson |
| 2009/0245206 A1 | 10/2009 | Liu |
| 2010/0317363 A1* | 12/2010 | Bai ................... H04W 72/0413 455/452.2 |
| 2013/0303223 A1* | 11/2013 | Patil ..................... H04W 8/005 455/517 |

\* cited by examiner

| | cell 1 | cell 2 | ...... | cell n |
|---|---|---|---|---|
| MR 1-RSRP | -90 dBm | -95 dBm | ...... | -92 dBm |
| MR 1'-RSRP | -83 dBm | -88 dBm | ...... | -96 dBm |
| AP 1-RSRP | [-90,-83] dBm | [-95,-88] dBm | ...... | [-96,-92] dBm |
| MR 2-RSRP | -85 dBm | -90 dBm | ...... | -95 dBm |

WIRELESS LOCAL AREA NETWORK DISCOVERY METHOD, DEVICE, AND SYSTEM

CROSS-REFERENCE TO RELATED APPLICATIONS

This application is a continuation of International Application No. PCT/CN2012/083131, filed on Oct. 18, 2012, which is hereby incorporated by reference in its entirety.

TECHNICAL FIELD

The present invention relates to the field of wireless communications technologies, and in particular, to a wireless local area network discovery method, a device, and a system.

BACKGROUND

With rapid development of user equipment (UE) and mobile applications, mobile data traffic increases sharply, and it becomes increasingly difficult for an existing cellular network of a telecommunications operator to meet a data traffic growth requirement. Therefore, the telecommunications operator expects to bear apart of mobile data traffic by means of a wireless local area network (WLAN), so as to ease traffic load of the existing cellular network. To achieve this objective, the telecommunications operator not only needs to deploy an access point (AP) of a wireless local area network in advance for UE access, but also needs to determine whether the UE is located within coverage of the WLAN, that is, a WLAN discovery problem needs to be resolved.

At present, a corresponding WLAN module is usually enabled in a UE that supports WLAN access, so as to search for an available AP around the UE. However, if the UE is not located within coverage of the AP, continuous search consumes more power of the UE, and reduces usable time of the UE. In the prior art, a UE may discover a WLAN with assistance of a cellular network, for example, a WLAN discovery method based on a cellular cell identifier. When the UE enters a cellular cell for which an AP is deployed in advance, the cellular network can instruct the UE to start a WLAN access module to search for an available AP nearby, and then access the WLAN.

However, in the prior art, there is at least a technical disadvantage as follows: because coverage of a cellular cell is generally much wider than coverage of an AP, when a UE enters a cellular cell for which an AP is deployed, it may still not be determined whether the UE is located within the coverage of the AP. In this case, if the UE is instructed to start the WLAN access module, an available AP may still not be found, which degrades user experience and wastes UE power.

SUMMARY

Embodiments of the present invention provide a wireless local area network discovery method, a device, and a system, so as to determine that a user equipment UE is located within coverage of an access point AP of a wireless local area network.

The embodiments of the present invention may be specifically implemented by using the following technical solutions:

According to a first aspect, a wireless local area network discovery method is provided, where the method includes:

acquiring, by a network node, an AP identifier of an access point AP of a wireless local area network and a first measurement result that is reported by a first user equipment UE, where the AP identifier is associated with the first measurement result;

acquiring, by the network node, a second measurement result reported by a second UE; and determining, by the network node according to the first measurement result and the second measurement result, whether the second UE is located within coverage of the AP.

With reference to the first aspect, in a first possible implementation manner of the first aspect, the network node is a base station, and acquiring, by the base station, the AP identifier and the first measurement result includes:

receiving, by the base station, the AP identifier and the first measurement result that are directly sent by the first UE to the base station; or receiving, by the base station, the AP identifier and the first measurement result that are sent by the first UE and forwarded by the AP.

With reference to the first aspect, in a second possible implementation manner of the first aspect, the network node is a network control node, and acquiring, by the network control node, the AP identifier and the first measurement result includes:

receiving, by the network control node, the AP identifier and the first measurement result that are sent by the first UE and forwarded by a base station; or receiving, by the network control node, the AP identifier and the first measurement result that are sent by the first UE and forwarded by the AP.

With reference to the first aspect, in a third possible implementation manner of the first aspect, the AP identifier and the first measurement result that are acquired by the network node are included in a same measurement report reported by the first UE; or the AP identifier and the first measurement result are separately included in different measurement reports reported by the first UE.

With reference to the first aspect, in a fourth possible implementation manner of the first aspect, the method further includes determining, by the network node, that the AP identifier is associated with the first measurement result, where the determining, by the network node, that the AP identifier is associated with the first measurement result includes:

acquiring, by the network node, connection establishment time, which is reported by the AP, of the first UE and the AP;

acquiring, by the network node, reporting time of the first measurement result; and if a time difference between the connection establishment time and the reporting time is less than a preset delay threshold, determining that the AP identifier is associated with the first measurement result.

With reference to the first aspect or any one of the first to the fourth possible implementation manners of the first aspect, in a fifth possible implementation manner of the first aspect, the determining, by the network node according to the first measurement result and the second measurement result, whether the second UE is located within coverage of the AP includes:

if a processing result of the second measurement result and the first measurement result is less than a preset error threshold, determining that the second UE is located within the coverage of the AP.

With reference to the first aspect or any one of the first to the fourth possible implementation manners of the first aspect, in a sixth possible implementation manner of the first aspect, there are multiple first measurement results;

determining, according to a minimum value and a maximum value in the multiple first measurement results, a value range of the first measurement result associated with the AP identifier; and if the second measurement result falls within the value range, determining that the second UE is located within the coverage of the AP.

With reference to the sixth possible implementation manner of the first aspect, in a seventh possible implementation manner of the first aspect, the determining, according to a minimum value and a maximum value in the multiple first measurement results, a value range associated with the AP identifier includes:

setting the minimum value as a lower limit of the value range, and setting the maximum value as an upper limit of the value range; or setting a result obtained by subtracting an error threshold from the minimum value as a lower limit of the value range, and setting a result obtained by adding the error threshold to the maximum value as an upper limit of the value range.

According to a second aspect, a wireless local area network discovery method is further provided, where the method includes:

acquiring, by a first user equipment UE, an AP identifier of an access point AP of a wireless local area network;

acquiring, by the first UE, a first measurement result; and reporting, by the first UE, the AP identifier and the first measurement result, where the AP identifier is associated with the first measurement result, and the first measurement result is used to be compared with a second measurement result reported by a second UE, so as to determine whether the second UE is located within coverage of the AP.

With reference to the second aspect, in a first possible implementation manner of the second aspect, the first UE reports both the AP identifier and the first measurement result in a same measurement report, or separately reports the AP identifier and the first measurement result in different measurement reports.

According to a third aspect, a network node is provided, where the network node includes:

a receiver, configured to receive an AP identifier of an access point AP of a wireless local area network, a first measurement result of a first user equipment UE, and a second measurement result of a second UE, where the AP identifier is associated with the first measurement result; and a processor, configured to determine, according to the first measurement result and the second measurement result, whether the second UE is located within coverage of the AP.

With reference to the third aspect, in a first possible implementation manner of the third aspect, the receiver may be further configured to receive connection establishment time, which is sent by the AP, of the first UE and the AP; and the processor may be further configured to acquire reporting time of the first measurement result, where the reporting time is used to be compared with the connection establishment time; and if a time difference between the connection establishment time and the reporting time is less than a preset delay threshold, determine that the AP identifier is associated with the first measurement result.

According to a fourth aspect, a user equipment UE is provided, where the UE includes:

a receiver, configured to receive an AP identifier of a connected access point AP or a found access point AP of a wireless local area network;

a processor, configured to acquire a first measurement result; and a sender, configured to send the AP identifier and the first measurement result, where the AP identifier is associated with the first measurement result, and the first measurement result is used to be compared with a second measurement result reported by a second UE, so as to determine whether the second UE is located within coverage of the AP.

With reference to the fourth aspect, in a first possible implementation manner of the fourth aspect, the processor may be further configured to include the AP identifier and the first measurement result in a same first measurement report; or may be further configured to include the AP identifier and the first measurement result in different measurement reports; and the sender may be further configured to send the first measurement report.

According to a fifth aspect, a base station is provided, where the base station includes:

a receiver, configured to receive an AP identifier of an access point AP of a wireless local area network and a first measurement result that is reported by a first user equipment UE, where the AP identifier is associated with the first measurement result; and a sender, configured to send the AP identifier and the first measurement result to a network node, so that the network node determines, according to the first measurement result and a second measurement result that is reported by a second UE, whether the second UE is located within coverage of the AP.

According to a sixth aspect, an access point AP of a wireless local area network is provided, where the AP includes:

a receiver, configured to receive a first measurement result reported by a first user equipment UE; and a sender, configured to send an AP identifier of the AP and the first measurement result to a network node, where the AP identifier is associated with the first measurement result, so that the network node determines, according to the first measurement result and a second measurement result that is reported by a second UE, whether the second UE is located within coverage of the AP.

According to a seventh aspect, another access point AP of a wireless local area network is further provided, where the AP includes:

a processor, configured to acquire connection establishment time of a connection between a first user equipment UE and the AP; and a sender, configured to send the connection establishment time to a network node, where the connection establishment time is used to be compared with reporting time of a first measurement result of the first user equipment UE, so as to determine that the AP is associated with the first measurement result.

According to an eighth aspect, a communications system is provided, including:

the network node according to the third aspect and the user equipment UE according to the fourth aspect or the first possible implementation manner of the fourth aspect; or the network node according to the third aspect, the user equipment UE according to the fourth aspect or the first possible implementation manner of the fourth aspect, and the base station according to the fifth aspect; or the network node according to the third aspect, the user equipment UE according to the fourth aspect or the first possible implementation manner of the fourth aspect, and the access point AP of the wireless local area network according to the sixth aspect; or the network node according to the first possible implementation manner of the third aspect and the access point AP of the wireless local area network according to the seventh aspect.

According to any technical solution provided in the first aspect to the eighth aspect, a network node may determine whether a second user equipment UE is located within coverage of an access point AP of a wireless local area network. If it is determined that the second UE is located within the coverage of the AP, the network node may instruct, when it is necessary, the second UE to accurately access the AP. For example, when the second UE performs packet data transmission, or a data volume for packet transmission performed by the second UE reaches a certain threshold, the network node instructs the second UE to accurately access the AP, thereby saving battery power of the second UE, and improving user experience.

According to a ninth aspect, a wireless local area network discovery method is provided, including:

acquiring, by a network node, an AP identifier of an access point AP of a wireless local area network and a first measurement result that is reported by a first user equipment UE, where the AP identifier is associated with the first measurement result; and broadcasting, by the network node, the AP identifier and the first measurement result, so that a second UE determines, according to a second measurement result and the first measurement result, whether the second UE is located within coverage of the AP.

With reference to the ninth aspect, in a first possible implementation manner of the ninth aspect, the AP identifier and the first measurement result that are acquired by the network node are included in a same measurement report reported by the first UE; or the AP identifier and the first measurement result are separately included in different measurement reports reported by the first UE.

With reference to the ninth aspect, in a second possible implementation manner of the ninth aspect, the method further includes determining, by the network node, that the AP identifier is associated with the first measurement result, where the determining, by the network node, that the AP identifier is associated with the first measurement result includes:

acquiring, by the network node, connection establishment time, which is reported by the AP, of the first UE and the AP;

acquiring, by the network node, reporting time of the first measurement result; and if a time difference between the connection establishment time and the reporting time is less than a preset delay threshold, determining that the AP identifier is associated with the first measurement result.

According to a tenth aspect, a wireless local area network discovery method is further provided, including:

acquiring, by a second user equipment UE, an AP identifier of an access point AP of a wireless local area network and a first measurement result, where the AP identifier and the first measurement result are broadcast by a network node, and the AP identifier is associated with the first measurement result;

acquiring, by the second UE, a second measurement result; and determining, by the second UE according to the second measurement result and the first measurement result, whether the second UE is located within coverage of the AP.

With reference to the tenth aspect, in a first possible implementation manner of the tenth aspect, determining, by the network node according to the first measurement result and the second measurement result, whether the second UE is located within the coverage of the AP includes:

if a processing result of the second measurement result and the first measurement result is less than a preset error threshold, determining that the second UE is located within the coverage of the AP.

With reference to the tenth aspect, in a second possible implementation manner of the tenth aspect, there are multiple first measurement results;

determining according to a minimum value and a maximum value in the multiple first measurement results, a value range of the first measurement result associated with the AP identifier; and if the second measurement result falls within the value range, determining that the second UE is located within the coverage of the AP.

With reference to the tenth aspect, in a third possible implementation manner of the tenth aspect, the determining, according to a minimum value and a maximum value in the multiple first measurement results, a value range associated with the AP identifier includes:

setting the minimum value as a lower limit of the value range, and setting the maximum value as an upper limit of the value range; or setting a result obtained by subtracting an error threshold from the minimum value as a lower limit of the value range, and setting a result obtained by adding the error threshold to the maximum value as an upper limit of the value range.

According to an eleventh aspect, a network node is provided, including:

a receiver, configured to receive an AP identifier of an access point AP of a wireless local area network and a first measurement result that is reported by a first user equipment UE, where the AP identifier is associated with the first measurement result; and a sender, configured to broadcast the AP identifier and the first measurement result to instruct a second UE to determine, according to a second measurement result and the first measurement result, whether the second UE is located within coverage of the AP.

With reference to the eleventh aspect, in a first possible implementation manner of the eleventh aspect, the receiver may be further configured to receive connection establishment time, which is sent by the AP, of the first UE and the AP; and the processor may be further configured to acquire reporting time of the first measurement result, where the reporting time is used to be compared with the connection establishment time; and if a time difference between the association establishment time and the reporting time is less than a preset delay threshold, determine that the AP identifier is associated with the first measurement result.

According to a twelfth aspect, a user equipment UE is provided, including:

a receiver, configured to receive an AP identifier of an access point AP of a wireless local area network and a first measurement result of a first UE, where the AP identifier and the first measurement result are broadcast by a network node, and the AP identifier is associated with the first measurement result; and a processor, configured to acquire a second measurement result, and determine, according to the second measurement result and the first measurement result, whether the UE itself is located within coverage of the AP.

According to a thirteenth aspect, a communications system is provided, including:

the user equipment UE according to the fourth aspect or the first possible implementation manner of the fourth aspect, the network node according to the eleventh aspect, and the user equipment UE according to the twelfth aspect; or the user equipment UE according to the fourth aspect or the first possible implementation manner of the fourth aspect, the base station according to the fifth aspect, the network node according to the eleventh aspect, and the user equipment UE according to the twelfth aspect; or the user equipment UE according to the fourth aspect or the first possible implementation manner of the fourth aspect, the access point AP of the wireless local area network according to the sixth aspect, the network node according to the eleventh aspect, and the user equipment UE according to the twelfth aspect; or the access point AP of the wireless local area network according to the seventh aspect, the network node according to the first possible implementation manner of the eleventh aspect, and the user equipment UE according to the twelfth aspect.

According to any technical solution provided in the ninth aspect to the thirteenth aspect, a user equipment UE may determine, with assistance of a network node, whether the UE is located within coverage of an AP, so as to accurately access the AP. Therefore, autonomy of the user equipment UE during discovery of a wireless local area network is improved, and battery power of the UE can also be saved.

DETAILED DESCRIPTION

To make the objectives, technical solutions, and advantages of the present invention clearer and more comprehensible, the following further describes the technical solutions of the present invention in detail with reference to the accompanying drawings and embodiments.

The technical solutions provided in embodiments of the present invention may be applied to various wireless communications networks, such as a Global System for Mobile Communications (GSM), a Code Division Multiple Access (CDMA) system, a Wideband Code Division Multiple Access (WCDMA) system, a Universal Mobile Telecommunications (UMTS) System, a general packet radio service (GPRS) system, a Long Term Evolution (LTE) system, and a Long Term Evolution Advanced (LTE-A). The terms "network" and "system" can be interchanged with each other.

In the embodiments of the present invention, a base station (BS) may be a station in communication with a user equipment (UE) or another communication station such as a relay station, and may provide communication coverage in a specific physical area. UEs may be distributed in an entire wireless network, and each UE may be static or mobile. The UE may be referred to as a terminal, a mobile station, a subscriber unit, or a station. The UE may be a cellular phone, a personal digital assistant (PDA), a wireless modem, a wireless communications device, a handheld device, a laptop computer, a cordless phone, a wireless local loop (WLL) station, or the like. An access point (AP) on a wireless local area network may also be called a wireless access node, a session node, or an access bridge. It may specifically indicate a pure wireless AP, may also indicate a wireless router, or may also indicate another device that is capable of providing access to the wireless local area network in a wireless manner for the UE. In the embodiments of the present invention, the base station works in the various wireless communications networks, such as the GSM system, the UMTS system, and the LTE system and the like, and the access point AP in the wireless local area network works in the wireless local area network.

Figures 1, 2:
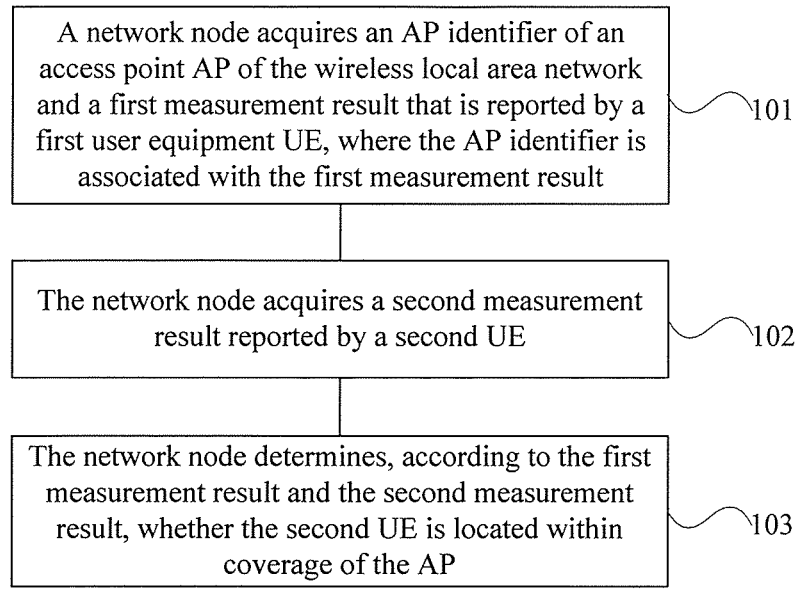
FIG. 1 is a schematic flowchart of a wireless local area network discovery method according to an embodiment of the present invention.
FIG. 2 is a schematic diagram of a wireless local area network discovery method according to an embodiment of the present invention.

Referring to FIG. 1, a wireless local area network discovery method according to an embodiment of the present invention includes:

Step 101. A network node acquires an AP identifier of an access point AP of a wireless local area network and a first measurement result that is reported by a first user equipment UE, where the AP identifier is associated with the first measurement result.

In this embodiment, the network node may be a base station, or may be a network control node. The network control node is used for centralized management of collaboration, for example, aspects such as load balancing and mobility, between a base station and an AP.

The AP identifier is used for distinguishing different APs, for example, may be a Media Access Control (MAC) address of an AP, or may be an AP number. The MAC address is also referred to as a hardware address, includes a 12-digit hexadecimal numeral with a length of 48 bits, and is unique globally. Numbering of the AP refers to pre-allocating different numbers to different APs, and the different APs are distinguished by using AP numbers. For example, it is assumed that four APs are deployed in coverage of a base station in advance, and numbers thereof are APs 1 to 4 sequentially, then only a 2-bit AP number needs to be transmitted to distinguish different APs, without a need to transmit a 48-bit MAC address, so as to save transmission overheads.

The first measurement result reported by the first UE is a measured value obtained by the first UE by measuring a cellular network cell. The cellular network cell includes a serving cell of the first UE, and may further include a neighboring cell of the first UE. In a cellular network, a base station may configure a UE to report measurement information, so as to support mobility control for the UE. For example, the base station may perform measurement configuration on the UE by sending a measurement configuration cell, where the measurement configuration cell may include a measured cell list, a criteria for reporting a measurement report by a UE, or detailed content that is expected to be reported by the UE, or the like. Therefore, the first measurement result may be measured values of a group of cellular network cells, and different cellular network cells may be distinguished by using cell identifiers.

A specific measurement result depends on a type of a cellular network, and the measurement configuration performed by the base station for the UE. For example, in a UMTS network, the first measurement result may be received signal code power. In an LTE network and an LTE-Advanced network, the first measurement result may be reference signal received power (RSRP) or may be reference signal received quality (RSRQ), and the first measurement result may include both the RSRP and the RSRQ. In this embodiment of the present invention, the first measurement result may not be limited to the foregoing examples, and may also include another measurement result obtained by measuring the cellular network cell.

That the AP identifier is associated with the first measurement result refers to that: after the first UE is connected to the AP or finds the AP, the first measurement result reported by the first UE is associated with the connected AP or the found AP, that is, the AP identifier is associated with the first measurement result. The first measurement result provides a measured value, which is obtained by the first UE by measuring the cellular network cell in the coverage of the AP, of the cellular network cell.

After the network node acquires the AP identifier and the first measurement result, if the AP identifier is also reported by the first UE, the AP identifier may be associated with the first measurement result by default. Optionally, the AP identifier and the first measurement result that are acquired by the network node may be included in a same measurement report reported by the first UE; or may be included in different measurement reports reported by the first UE.

That the network node acquires the AP identifier and the first measurement result that are reported by the first UE may be implemented, for example, by means of any one of the following four scenarios:

Scenario 1. If the network node is a base station, the base station receives the AP identifier and the first measurement result that are directly sent by the first UE to the base station.

Scenario 2. If the network node is a base station, the base station receives the AP identifier and the first measurement result that are sent by the first UE and forwarded by the AP.

Scenario 3. If the network node is a network control node, the network control node receives the AP identifier and the first measurement result that are sent by the first UE and forwarded by a base station.

Scenario 4. If the network node is a network control node, the network control node receives the AP identifier and the first measurement result that are sent by the first UE and forwarded by the AP.

The foregoing four scenarios are only implementation manners illustrated in this embodiment of the present invention. This embodiment of the present invention is not limited to the four scenarios.

After the network node acquires the AP identifier and the first measurement result, if the AP identifier is not reported by the first UE, it may be further determined that the AP identifier is associated with the first measurement result. Optionally, step 101 may further include:

acquiring, by the network node, connection establishment time, which is reported by the AP, of the first UE and the AP;

acquiring, by the network node, reporting time of the first measurement result; and if a time difference between the connection establishment time and the reporting time is less than a preset delay threshold, determining that the AP identifier is associated with the first measurement result.

Step 102. The network node acquires a second measurement result reported by a second UE.

The second measurement result reported by the second UE is a measured value that is obtained by the second UE by measuring a cellular network cell. The cellular network cell includes a serving cell of the second UE, or may include a neighboring cell of the second UE. The serving cell of the first UE and the serving cell of the second UE may be a same cellular network cell. The serving cell of the first UE and the serving cell of the second UE may be different cellular network cells. For example, the serving cell of the first UE may be a neighboring cell of the second UE. For a specific measurement result, refer to description in step 101, which is not repeatedly described herein.

Step 103. The network node determines, according to the first measurement result and the second measurement result, whether the second UE is located within coverage of the AP.

The first measurement result is a measured value obtained by measuring a cellular network cell by the first UE that is connected to the AP or finds the AP, and a specific value of the measured value is closely related to a geographical position at which the first UE is located. The first UE is connected to the AP or finds the AP, which indicates that the geographical position at which the first UE is located is located within the coverage of the AP. If another UE is also located within the coverage of the AP, the other UE may obtain a measured value the same as or close to the first measurement result by measuring the cellular network cell.

Because the measured value is closely related to a geographical position, correspondingly, it may also be determined, according to the first measurement result associated with the AP identifier and the second measurement result, whether the second UE is located within the coverage of the AP. For example, if a difference value between the second measurement result and the first measurement result associated with the AP identifier is less than a preset error threshold, it is determined that the second UE is located within the coverage of the AP.

In this embodiment, the network node uses the measurement result obtained by the UE by measuring the cellular network cell to determine whether the second UE is located within the coverage of the AP. That is, the determining is performed according to an interrelationship between the first measurement result and the second measurement result without additional calculation of physical coverage of the AP and a geographical position of the second UE. In addition, if it is determined that another UE is located within the coverage of the AP, the network node may instruct, when it is necessary, the another UE to accurately access the AP. For example, when the UE performs packet data transmission, or a data volume for packet transmission performed by the UE reaches a specific threshold, the network node instructs the UE to accurately access the AP, thereby saving battery power of the UE, and improving user experience.

It can be understood that the coverage of the AP physically refers to a signal coverage area of the AP, and a UE located in the area may find the AP. In this embodiment, the network node determines whether the second UE is located within the coverage of the AP, and that the network node determines that the second UE is located within the coverage of the AP can be used to instruct the second UE to access the AP. Actually, when the second UE has already been located in an adjacent area of the AP, for example, the second UE has already been located within physical coverage of the AP or at a position near the physical coverage of the AP, the UE may be instructed to search for and access the AP. When the second UE is located at a position near the physical coverage of the AP, the error threshold may also be used to instruct the second UE to search for and access the AP.

The error threshold refers to a maximum acceptable error of a processing result of the second measurement result and the first measurement result. When the processing result is less than the error threshold, it may be considered that values of the second measurement result and the first measurement result are the same or close. A smaller value of the error threshold provides a lower false alarm probability for determining whether the second UE is located within the coverage of the AP. Physically, it indicates that a condition that the second UE is located at a position near the physical coverage of the AP is stricter. The false alarm probability refers to a probability that the second UE is not located within the coverage of the AP, but it is incorrectly determined that the second UE is located within the coverage of the AP.

In an actual application, the error threshold may be predetermined by an operator, for example, the error threshold may be set according to an empirical value or according to an actual network environment. For example, the error threshold may be preset according to a requirement of a false alarm probability. Alternatively, the error threshold may be adjusted in real time by the network node in a running process according to a network running status, for example, the error threshold may also be adjusted according to an association status of a UE and an AP.

Therefore, in this embodiment, when the network node determines that the second UE is located within the coverage of the AP, it may be understood that the second UE has been already located in an adjacent area of the AP, and in this case, the network node may instruct the second UE to search for and access the AP, which is not exactly limited to that the second UE has been already located within the physical coverage of the AP.

That the processing result of the second measurement result and the first measurement result associated with the AP identifier is less than a preset error threshold may refer to that a result of a difference value between measured values of same cells in the second measurement result and the first measurement result is less than the preset error threshold. The same cells may be identified by using an identifier, for example, the same cells may refer to cellular network cells having a same cell identifier. Because measurement configurations performed by a base station for a UE are not necessarily the same, the number of cellular network cells in the second measurement result may not be exactly the same as the number of cellular network cells in the first measurement result. Therefore, same cells in the first measurement result may refer to cells the same as all cellular network cells in the second measurement result, and may also refer to cells the same as some cellular network cells in the second measurement result.

Optionally, that the result of the difference value between the measured values of the same cells in the second measurement result and the first measurement result is less than the preset error threshold may be that: a difference value of measured values of each cell in the same cells is compared with the error threshold one by one to obtain the number of same cells of which difference values are less than the error threshold; and when the number of same cells is greater than or equal to a minimum number of same cells, where the minimum number is required during the determining, it may be determined that the second UE is located within the coverage of the AP. In this embodiment of the present invention, a balance between the number of the same cells, where the minimum number is required during the determining, and the error threshold may also be considered comprehensively. For example, when the minimum number of the same cells is relatively large, where the minimum number is required during the determining, correspondingly the error threshold may be appropriately set to a larger value; or, when the minimum number of the same cells is relatively small, where the minimum number is required during the determining, correspondingly the error threshold may be appropriately set to a smaller value.

Alternatively, the result of the difference value between the measured values of the same cells in the second measurement result and the first measurement result is less than the preset error threshold may be that: a difference value of measured values of each cell in the same cells is uniformly pre-processed, for example, statistics processing, such as weighted summation or averaging, or summation after taking the logarithm may be performed on the difference value of the measured values of each cell, so as to obtain a comprehensive difference value. When the comprehensive difference value is less than the preset error threshold, it may be determined that the second UE is located within the coverage of the AP. In this case, the minimum number of same cells may not need to be preset, where the minimum number is required during the determining.

In addition, because a same AP may be connected to multiple UEs, or may be detected by multiple UEs, all the UEs may be the first UE mentioned in this embodiment of the present invention, and all the multiple UEs may measure a cellular network cell and report measurement results. Furthermore, even if there is only one first UE, the first measurement result may be reported for multiple times with change of time and positions. Therefore, there may also be multiple first measurement results associated with the AP identifier. In this case, the determining whether the second UE is located within the coverage of the AP may further be determining, according to the multiple first measurement results associated with the AP identifier and the second measurement result, whether the second UE is located within the coverage of the AP. For example, the second measurement result may be separately compared with each first measurement result in the multiple first measurement results associated with the AP identifier; and as long as any first measurement result meets description of the foregoing determining process, it may be determined that the second UE is located within the coverage of the AP.

Optionally, in this embodiment, the network node may also determine, according to a minimum value and a maximum value in the multiple first measurement results, a value range of the first measurement result associated with the AP identifier; if the second measurement result falls within the value range, it is determined that the second UE is located within coverage of the AP. For example, the following may be included: the minimum value is set as a lower limit of the value range, the maximum value is set as an upper limit of the value range; or a result obtained by subtracting the error threshold from the minimum value is set as a lower limit of the value range, and a result obtained by adding the error threshold to the maximum value is set as an upper limit of the value range.

That the second measurement result falls within the value range more specifically refers to that measured values of a cellular cell in the second measurement result fall within a value range of same cells in the first measurement result. The same cells refer to cellular network cells having a same cell identifier. A setting principle of the number, which is required during the determining, of the same cells and the error threshold is consistent with that described above, and is not repeatedly described herein. In this embodiment, the network node is required to execute step 101 for at least one time before executing step 103, so as to acquire at least one first measurement result associated with the AP identifier, and is also required to execute step 102 for at least one time, so as to acquire at least one second measurement result. However, an execution sequence of step 101 and step 102 is not limited, and the number of executions of step 101, step 102, and step 103 is also not limited.

It can be understood that the method provided in this embodiment may be executed for multiple times. For example, when it is not determined that the second UE is located within the coverage of the AP, after the first measurement result or the second measurement result is acquired again, it may still be determined whether the second UE is located within the coverage of the AP. In addition, even if it is not determined that the second UE is located within the coverage of the AP, it may further be continued to be determined, for another AP, whether the second UE is located within coverage of another AP.

In the prior art, even if a cellular network has determined that a UE enters a cellular cell for which an AP is deployed in advance, the cellular network cannot determine that whether the UE enters coverage of the AP. When the UE does not enter the coverage of the AP, if the cellular network instructs the UE to access a WLAN, the UE cannot still find an available AP, which reduces user experience and wastes battery power of the UE.

By using the wireless local area network discovery method disclosed in this embodiment of the present invention and shown in FIG. 1, a network node may determine, according to a measurement result obtained by measuring a cellular network cell by a UE that is connected to an AP or finds the AP, and a measurement result of another UE, whether the another UE is located within coverage of the AP. The UE that is connected to an AP or finds the AP may be a first UE, and the another UE may be a second UE. If it is determined that another UE is located within the coverage of the AP, the network node may instruct, when it is necessary, the other UE to accurately access the AP. For example, when the UE performs packet data transmission, or a data volume for packet transmission performed by the UE reaches a specific threshold, the network node instructs the UE to accurately access the AP, thereby saving battery power of the UE, and improving user experience.

FIG. 2 is a schematic diagram of a wireless local area network discovery method according to an embodiment of the present invention, which is used to further describe the embodiment shown in FIG. 1. It is assumed that two UEs are connected to a same AP or find a same AP, both the two UEs may be referred to as the first UE in the embodiment shown in FIG. 1, and may be separately marked as UE 1 and UE 1' for distinction. It is assumed that all measurement results obtained by the two UEs by measuring cellular network cells are reference signal received power RSRP of a group of cellular network cells, all the measurement results may be referred to as the first measurement result in the embodiment shown in FIG. 1, and may be separately marked as MR1-RSRP and MR1'-RSRP for ease of distinction. In addition, another UE that is not connected to the AP or find the AP may be referred to as the second UE in the embodiment shown in FIG. 1, and may be marked as UE 2. A measurement result obtained by the UE 2 by measuring a cellular network cell is a second measurement result, which is marked as MR2-RSRP. In general, an AP identifier of the AP may be marked as AP 1, and the first measurement result associated with the AP identifier is marked as AP1-RSRP.

In FIG. 2, cell 1, cell 2, . . . , cell n indicate that there are a total of n different cellular network cells, where n is greater than or equal to 3. The cell 1 indicates a cell identifier of a cellular network cell 1, the cell 2 indicates a cell identifier of a cellular network cell 2 and so on, and the cell n indicates a cell identifier of a cellular network cell n. MR1-RSRP {−90 dBm, −95 dBm, . . . , −92 dBm} indicates reference signal received power RSRP of a group of cellular network cells of the UE 1, where a value of RSRP of the cellular network cell 1 is −90 dBm, a value of RSRP of the cellular network cell 2 is −95 dBm and so on, and a value of RSRP of the cellular network cell n is −92 dBm. Similarly: reference signal received power RSRP, which is represented as MR1'-RSRP {−83 dBm, −88 dBm, . . . , −96 dBm} in FIG. 2, of a group of cellular network cells of the UE 1' may also be obtained, where −83 dBm indicates a value of RSRP obtained by the UE 1' by measuring the cellular network cell 1 (cell 1). It may be discovered that both the UE 1 and the UE 1' are connected to the AP or find the AP, but measurement results obtained by the UE 1 and the UE 1' by measuring the same cellular network cell 1 are not the same. It indicates that the UE 1 and the UE 1' are located within coverage of a same AP, but geographical positions at which the UE 1 and the UE 1' are located are not exactly the same, and therefore, measurement results of a same cellular network cell are also different.

Specific meanings of another value in MR1'-RSRP and a value in MR2-RSRP may be deduced by analogy, and are not repeatedly described. In addition, in a network node, it is assumed that a minimum number of same cells is 3, where the minimum number is required during the determining, a preset error threshold is 4 dBm. With reference to FIG. 2, the following describes determining whether a second UE is located within coverage of the AP in the embodiment shown in FIG. 1.

If the network node acquires only MR1-RSRP in FIG. 2, but does not acquire MR1'-RSRP, in this case, a value of RSRP of a cellular network cell in AP1-RSRP is the same as that of MR1-RSRP. After acquiring MR2-RSRP, the network node compares MR2-RSRP and AP1-RSRP, which may be equivalent to that the network node compares MR2-RSRP and MR1-RSRP. It may be discovered that, an RSRP difference value in the cellular network cell n is 3 dBm and is less than a preset error threshold, but both RSRP difference values in the cellular network cell 1 and the cellular network cell 2 are greater than the preset error threshold. In this case, if another cellular network cell is not considered, the number of cells does not reach the minimum number of same cells, where the minimum number is required during the determining, and in this case, it cannot be determined whether the UE 2 is located within the coverage of the AP.

If the network node acquires only MR1'-RSRP in FIG. 2, but does not acquire MR1-RSRP, in this case, a value of RSRP of a cellular network cell in AP1-RSRP is the same as that of MR1'-RSRP. After acquiring MR2-RSRP, the network node compares MR2-RSRP and AP1-RSRP, which may be equivalent to that the network node compares MR2-RSRP and MR1'-RSRP. It may be discovered that, all RSRP difference values in the cellular network cell 1, the cellular network cell 2, and the cellular network cell n are less than the preset error threshold, and the number of cells reaches the minimum number of same cells, where the minimum number is required during the determining. In this case, it can be determined that the UE 2 is located within the coverage of the AP.

If the network node has acquired two first measurement results MR1-RSRP and MR1'-RSRP that are associated with the AP identifier. Referring to the embodiment shown in FIG. 1, a value range of the first measurement result may be obtained according to a maximum value and a minimum value of MR1-RSRP and MR1'-RSRP. Optionally, the minimum value is set as a lower limit of the value range, and the maximum value is set as an upper limit of the value range. In FIG. 2, a value range of AP1-RSRP is obtained according to the foregoing rule, where [−90, −83] dBm indicates a value range of a measurement result corresponding to the cellular network cell 1 in the first measurement result, [−95, −88] dBm indicates a value range of a measurement result corresponding to the cellular network cell 2 in the first measurement result, [−96, −92] dBm indicates a value range of a measurement result corresponding to the cellular network cell n in the first measurement result, and so on. It should be noted herein that, the value range of the first measurement result is obtained according to the maximum value and the minimum value of MR1-RSRP and MR1'-RSRP, where all the maximum value, the minimum value, and the value range are used for a same cellular network cell. For different cellular network cells, a value cannot be used for different cellular network cells.

By comparing MR2-RSRP and AP1-RSRP, it may be discovered that all RSRP values of the cellular network 1, the cellular network cell 2, and the cellular network cell n in MR2-RSRP fall within a value range of same cells of AP1-RSRP, the number of cells has reached the minimum number of same cells, where the minimum number is required in the determining. In this case, it can be determined that the UE 2 is located within the coverage of the AP.

Optionally, a result obtained by subtracting an error threshold from the minimum value may also be set as a lower limit of the value range, and a result obtained by adding the error threshold to the maximum value is set as an upper limit of the value range. A subsequent determining process is similar, and is not repeatedly described herein.

It can be understood that, values in FIG. 2 are only exemplary, where specific values of the RSRP, the minimum number of same cells, where the minimum number is required in the determining, a preset error threshold, and the like are not used as a limitation to an actual application.

Figure 3:
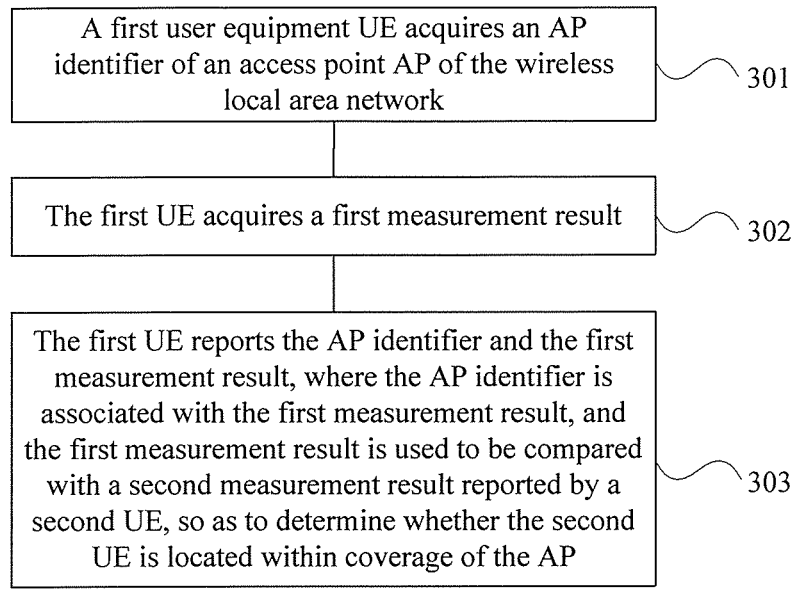
FIG. 3 is a schematic flowchart of another method for discovering a wireless local area network according to an embodiment of the present invention.

Referring to FIG. 3, an embodiment of the present invention provides another wireless local area network discovery method, including:

Step 301. A first user equipment UE acquires an AP identifier of an access point AP of a wireless local area network.

After the first UE is connected to the AP or finds the AP, the first UE may obtain the AP identifier of the AP. That the first UE finds the AP may be that the first UE obtains, by listening, a broadcast beacon that is regularly sent by the AP, or may be that the first UE obtains the AP identifier by using a probe response obtained by active scanning. When the AP is found, the UE may access a wireless local area network by using the AP by sending an association request.

Step 302. The first UE acquires a first measurement result.

The first UE may obtain the first measurement result by measuring a cellular network cell.

Step 303. The first UE reports the AP identifier and the first measurement result to a network node, where the AP identifier is associated with the first measurement result, and the first measurement result is used to be compared with a second measurement result reported by a second UE, so as to determine whether the second UE is located within coverage of the AP.

A main difference between the wireless local area network discovery method according to this embodiment and the wireless local area network discovery method according to the embodiment shown in FIG. 1 lies in that: a technical solution is described from a user equipment side in this embodiment, and the technical solution is described from a network device side in the embodiment shown in FIG. 1. For the AP identifier, the first measurement result, the second measurement result, and a determining process, refer to description of the embodiment shown in FIG. 1, which is not repeatedly described herein.

Optionally, in this embodiment, that the first UE reports the AP identifier and the first measurement result may include that: the first UE reports both the AP identifier and the first measurement result in a same measurement report, or separately reports the AP identifier and the first measurement result in different measurement reports.

Figure 4:
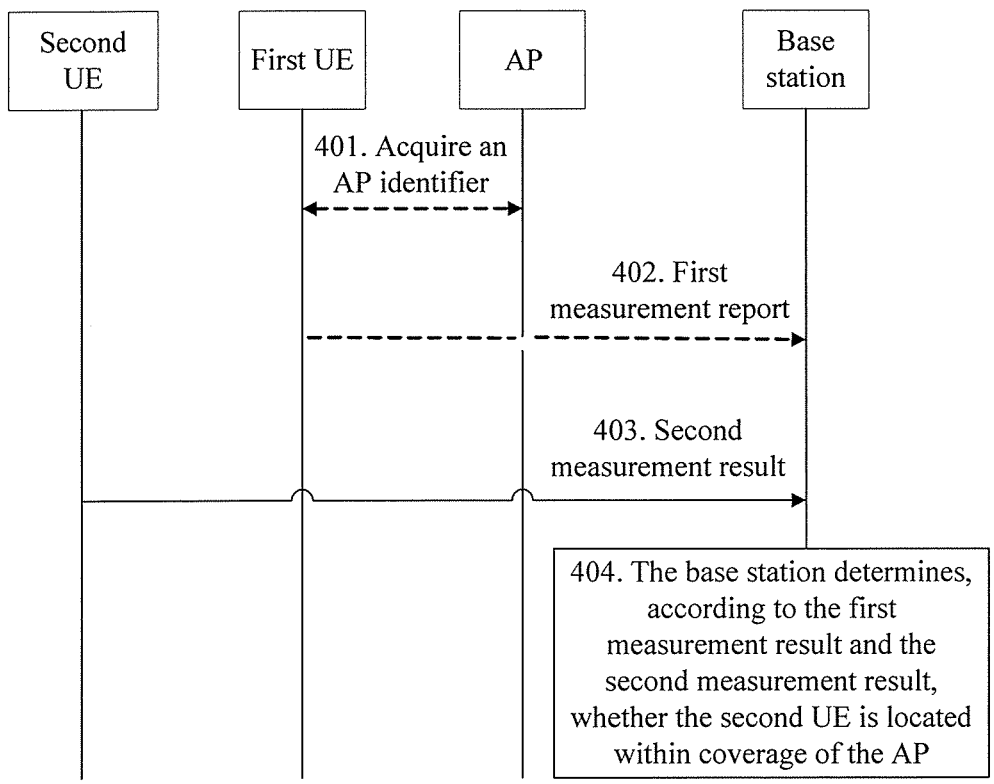
FIG. 4 is a schematic flowchart of a wireless local area network discovery method according to an embodiment of the present invention.

Referring to FIG. 4, an embodiment of the present invention provides a wireless local area network discovery method, including:

Step 401. A first user equipment UE is connected to an access node AP of a wireless local area network, or the first UE finds the AP, so as to obtain an AP identifier of the AP.

Step 402. A base station acquires a first measurement report reported by the first UE, where the first measurement report includes the AP identifier and a first measurement result that is obtained by the first UE by measuring a cellular network cell.

That a base station acquires a first measurement report may include that: receiving, by the base station, the first measurement report that is directly sent by the first UE to the base station; or receiving, by the base station, the first measurement report that is sent by the first UE and forwarded by the AP.

Step 403. The base station acquires a second measurement result reported by a second UE.

Step 404. The base station determines, according to the first measurement result and the second measurement result, whether the second UE is located within coverage of the AP.

This embodiment is a further implementation manner of the embodiment shown in FIG. 1. The base station in this embodiment is the network node in the embodiment shown in FIG. 1, and the base station acquires the AP identifier and the first measurement result by using the first measurement report reported by the first UE. For specific content in this embodiment, refer to description in the embodiment shown in FIG. 1, which is not repeatedly described herein.

Figure 5:
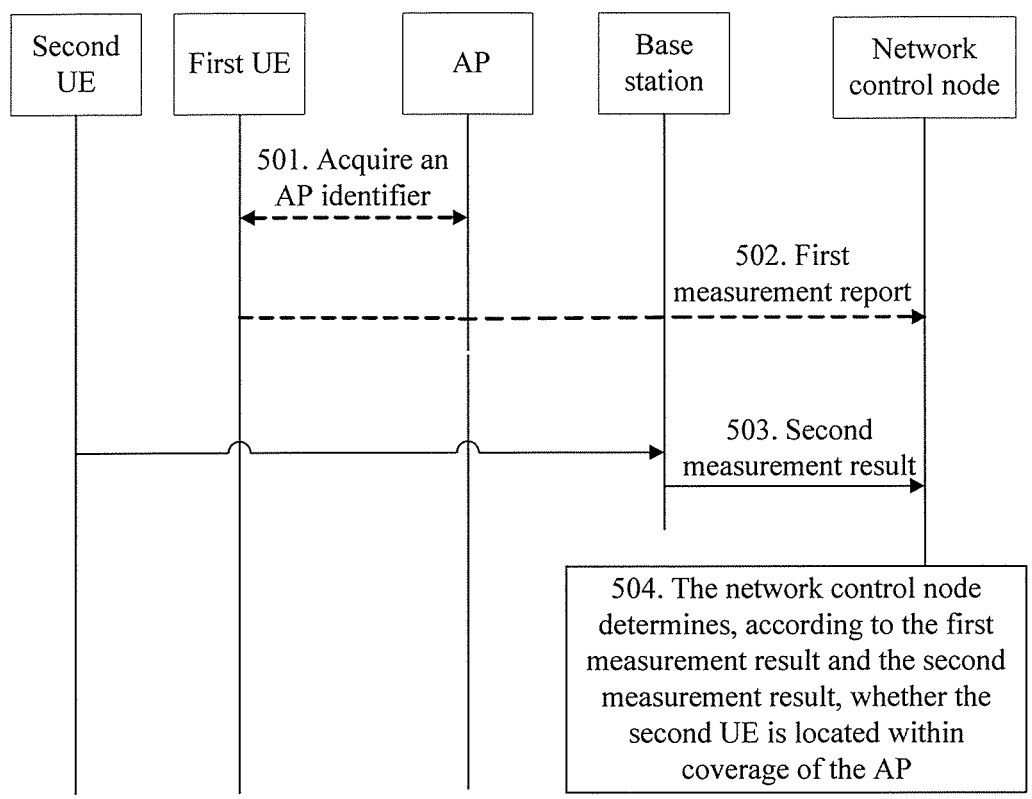
FIG. 5 is a schematic flowchart of another wireless local area network discovery method according to an embodiment of the present invention.

Referring to FIG. 5, an embodiment of the present invention provides another wireless local area network discovery method, including:

Step 501. A first user equipment UE is connected to an access node AP of a wireless local area network, or the first UE finds the AP, so as to obtain an AP identifier of the AP.

Step 502. A network control node acquires a first measurement report reported by the first UE, where the first measurement report includes the AP identifier and a first measurement result that is obtained by the first UE by measuring a cellular network cell.

That a network control node acquires a first measurement report may include that: receiving, by the network control node, the first measurement report that is sent by the first UE and forwarded by a base station; or receiving, by the network control node, the first measurement report that is sent by the first UE and forwarded by the AP.

Step 503. The network control node acquires a second measurement result reported by a second UE, where the second measurement result is sent by the second UE and is forwarded to the network control node by using the base station.

Step 504. The network control node determines, according to the first measurement result and the second measurement result, whether the second UE is located within coverage of the AP.

The wireless local area network discovery method according to this embodiment may be executed by a network control node, and the network control node is used for centralized management of collaboration, for example, aspects such as load balancing and mobility, between a base station and an AP. This embodiment is also a further implementation manner of the embodiment shown in FIG. 1. The network control node in this embodiment is the network node in the embodiment shown in FIG. 1, and the network control node acquires the AP identifier and the first measurement result by using the first measurement report reported by the first UE. For specific content in this embodiment, refer to description in the embodiment shown in FIG. 1, which is not repeatedly described herein.

Compared with that the method in the embodiment shown in FIG. 4 is executed by a base station, the network control node in this embodiment may be interconnected with multiple base stations and multiple APs at the same time, and therefore in coverage which is not limited to coverage of a single base station, more first measurement results associated with the AP identifier and more second measurement results can be acquired. Therefore, an application range of the wireless local area network discovery method may be expanded.

Figure 6:
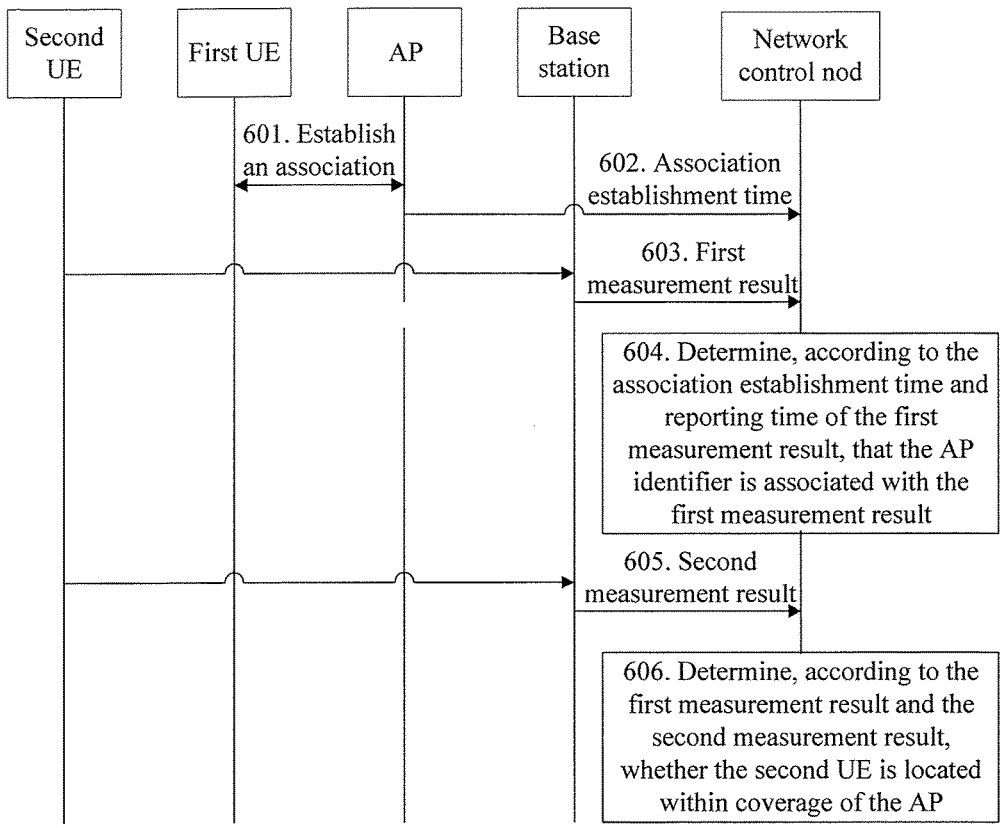
FIG. 6 is a schematic flowchart of a wireless local area network discovery method according to an embodiment of the present invention.

Referring to FIG. 6, an embodiment of the present invention provides another wireless local area network discovery method, including:

Step 601. A first user equipment UE is connected to an access point AP of a wireless local area network.

Step 602. A network control node receives connection establishment time, which is reported by the AP, for the connection.

Optionally, the connection time may be included in a connection establishment report by the AP for reporting, where the connection establishment report may further include an AP identifier of the AP and an identifier of the first UE. After acquiring the identifier of the first UE, the network control node may identify a first measurement result reported by the first UE, and determine that the AP identifier is associated with the first measurement result.

Step 603. The network control node receives a first measurement result reported by the first UE, and acquires reporting time of the first measurement result.

Optionally, that the network control node acquires reporting time of the first measurement result may be that: after receiving the first measurement result, the network control node acquires the reporting time according to an estimated transmission delay from the first UE to a base station or the AP or from a base station or the AP to the network control node.

Step 604. The network control node determines, according to the connection establishment time and the reporting time, that the AP identifier is associated with the first measurement result.

Optionally, if a time difference between the connection establishment time and the reporting time is less than a preset delay threshold, it is determined that the AP identifier is associated with the first measurement result. The delay threshold refers to a maximum acceptable delay of the time difference between the connection establishment time and the reporting time. When the time difference is less than the delay threshold, it may be considered that values of the second measurement result and the first measurement result are the same or close.

Step 605. The network control node receives a second measurement result reported by a second UE.

Step 606. The network control node determines, according to the first measurement result associated with the AP identifier and the second measurement result, whether the second UE is located within coverage of the AP.

For a process for determining, by the network control node, whether the second UE is located within the coverage of the AP in step 606, refer to description in the embodiment shown in FIG. 1, where the two has a same determining criteria, which is not repeatedly described herein. It may be understood that the wireless local area network discovery method according to this embodiment may also be executed by a base station. For a difference between the base station and the network control node, refer to the embodiment shown in FIG. 5. A specific process performed by the base station is not repeatedly described herein.

By using the technical solution provided in the embodiment shown in FIG. 6, the first UE and the second UE do not need to perform additional configuration in advance, but only need to report a measurement report according to a normal measurement reporting process. The network node determines, according to the connection establishment time provided by the AP and the reporting time of the first measurement result, that the AP identifier is associated with the first measurement result. Then, it may be determined, according to the first measurement result and the second measurement result, whether the second UE is located within the coverage of the AP.

If it is determined that the second UE is located within the coverage of the AP, the network node may instruct, when it is necessary, the second UE to accurately access the AP. For example, when the second UE performs packet data transmission, or a data volume for packet transmission performed by the second UE reaches a specific threshold, the network node instructs the second UE to accurately access the AP, thereby saving battery power of the UE, and improving user experience.

Figure 7:
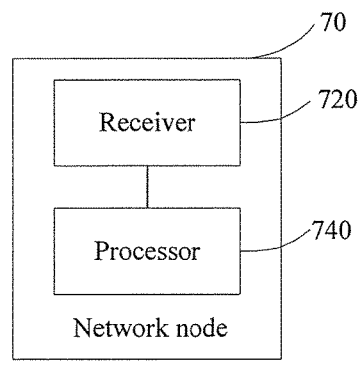
FIG. 7 is a schematic structural diagram of a network node according to an embodiment of the present invention.

Referring to FIG. 7, an embodiment of the present invention provides a network node 70, including:

a receiver 720, configured to receive an AP identifier of an access point AP of a wireless local area network, a first measurement result of a first user equipment UE, and a second measurement result of a second UE, where the AP identifier is associated with the first measurement result; and a processor 740, configured to determine, according to the first measurement result and the second measurement result, whether the second UE is located within coverage of the AP.

Optionally, the receiver 720 in the network node 70 may be further configured to receive connection establishment time, which is sent by the AP, of the first UE and the AP. The processor 740 may be further configured to acquire reporting time of the first measurement result, where the reporting time is used to be compared with the connection establishment time; and if a time difference between the connection establishment time and the reporting time is less than a preset delay threshold, determine that the AP identifier is associated with the first measurement result.

The network node 70 may be a network node that is configured to determine whether the second UE is located within the coverage of the AP in the foregoing method embodiments, and the network node 70 can be applied to the foregoing method embodiments. The network node 70 may be a network node in embodiments shown in FIG. 1 and FIG. 3, may be a base station in the embodiment shown in FIG. 4, or also be a network control node in an embodiment shown in FIG. 5 or FIG. 6. For a method for determining, by the processor 740 in the network node 70, whether the second UE is located within the coverage of the AP, refer to description in the foregoing method embodiments, which is not repeatedly described herein.

Figure 8:
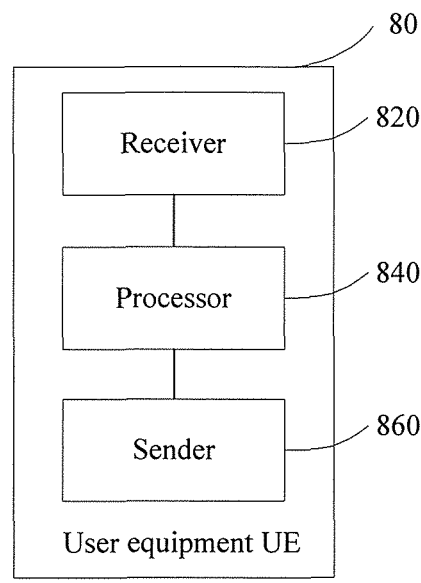
FIG. 8 is a schematic structural diagram of a user equipment UE according to an embodiment of the present invention.

Referring to FIG. 8, an embodiment of the present invention provides a user equipment UE 80, including:

a receiver 820, configured to receive an AP identifier of an access point AP of a wireless local area network;

a processor 840, configured to acquire a first measurement result; and a sender 860, configured to send the AP identifier and the first measurement result, where the AP identifier is associated with the first measurement result, and the first measurement result is used to be compared with a second measurement result reported by a second UE, so as to determine whether the second UE is located within coverage of the AP.

Optionally, the processor 840 may be further configured to include the AP identifier and the first measurement result in a same first measurement report; and the sender may be further configured to send the first measurement report. The user equipment UE 80 in this embodiment may be a first user equipment UE in an embodiment shown in any one of FIG. 1 and FIG. 3 to FIG. 6, and the user equipment UE 80 can be applied to the foregoing method embodiments. For specific description, refer to description of the foregoing method embodiments, which is not repeatedly described herein.

Figure 9:
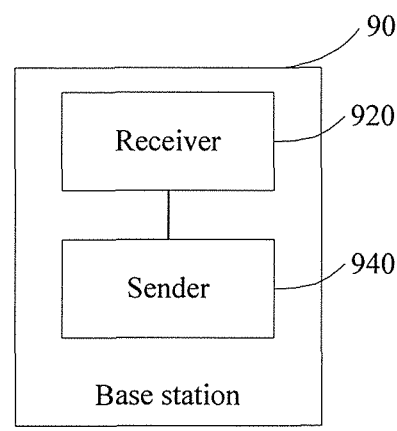
FIG. 9 is a schematic structural diagram of a base station according to an embodiment of the present invention.

Referring to FIG. 9, an embodiment of the present invention provides a base station 90, including:

a receiver 920, configured to receive an AP identifier of an access point AP of a wireless local area network and a first measurement result that is reported by a first user equipment UE, where the AP identifier is associated with the first measurement result; and a processor 940, configured to send the AP identifier and the first measurement result to a network node, so that the network node determines, according to the first measurement result and a second measurement result that is reported by a second UE, whether the second UE is located within coverage of the AP.

The base station 90 may be a base station in an embodiment shown in any one of FIG. 1, FIG. 3, FIG. 5, and FIG. 6. The base station can be applied to the foregoing method embodiments and is configured to forward the AP identifier and the first measurement result to the network node. For specific description, refer to the embodiments, which is not repeatedly described herein.

Figure 10:
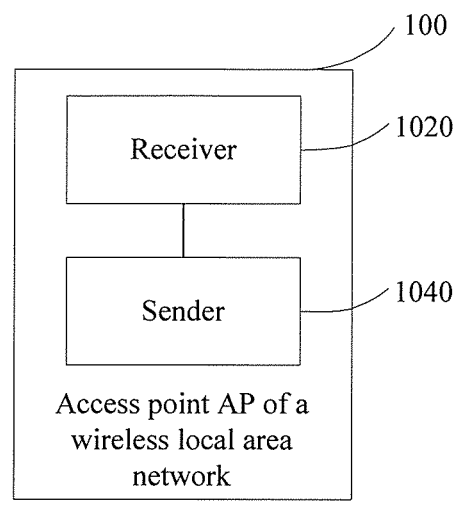
FIG. 10 is a schematic structural diagram of an access point AP of a wireless local area network according to an embodiment of the present invention.

Referring to FIG. 10, an embodiment of the present invention provides an access point AP 100 of a wireless local area network, including:

a receiver 1020, configured to receive a first measurement result reported by a first user equipment UE; and a sender 1040, configured to send an AP identifier of the AP 100 and the first measurement result to a network node, where the AP identifier is associated with the first measurement result, so that the network node determines, according to the first measurement result and a second measurement result that is reported by a second UE, whether the second UE is located within coverage of the AP.

The AP 100 may be an AP in an embodiment shown in any one of FIG. 1, FIG. 3, FIG. 4, and FIG. 5. The AP 100 can be applied to the foregoing method embodiments and is configured to forward the AP identifier and the first measurement result to the network node. For specific description, refer to the method embodiments, which is not repeatedly described herein.

Figure 11:
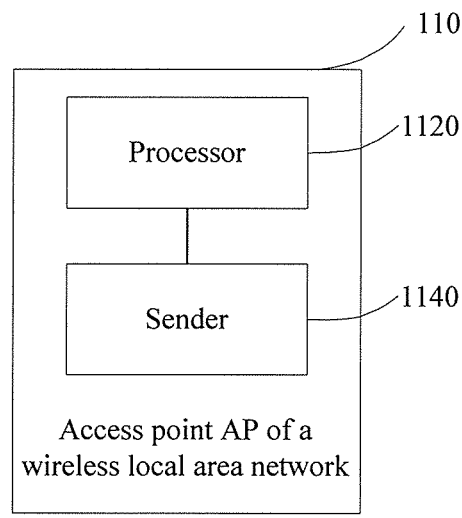
FIG. 11 is a schematic structural diagram of another access point AP of a wireless local area network according to an embodiment of the present invention.

Referring to FIG. 11, an embodiment of the present invention provides another access point AP 110 of a wireless local area network, including:

a processor 1120, configured to acquire connection establishment time of a connection between a first user equipment UE and the AP 110; and a sender 1140, configured to send the connection establishment time to a network node, where the connection establishment time is used to be compared with reporting time of a first measurement result of the first UE, so as to determine that the AP is associated with the first measurement result.

The AP 110 may be an AP in the embodiment shown in FIG. 6. The AP 110 can be applied in the method embodiments and is configured to send the connection establishment time to the network node. For specific description, refer to embodiments shown in FIG. 1 and FIG. 6, which is not repeatedly described herein.

Figure 12:
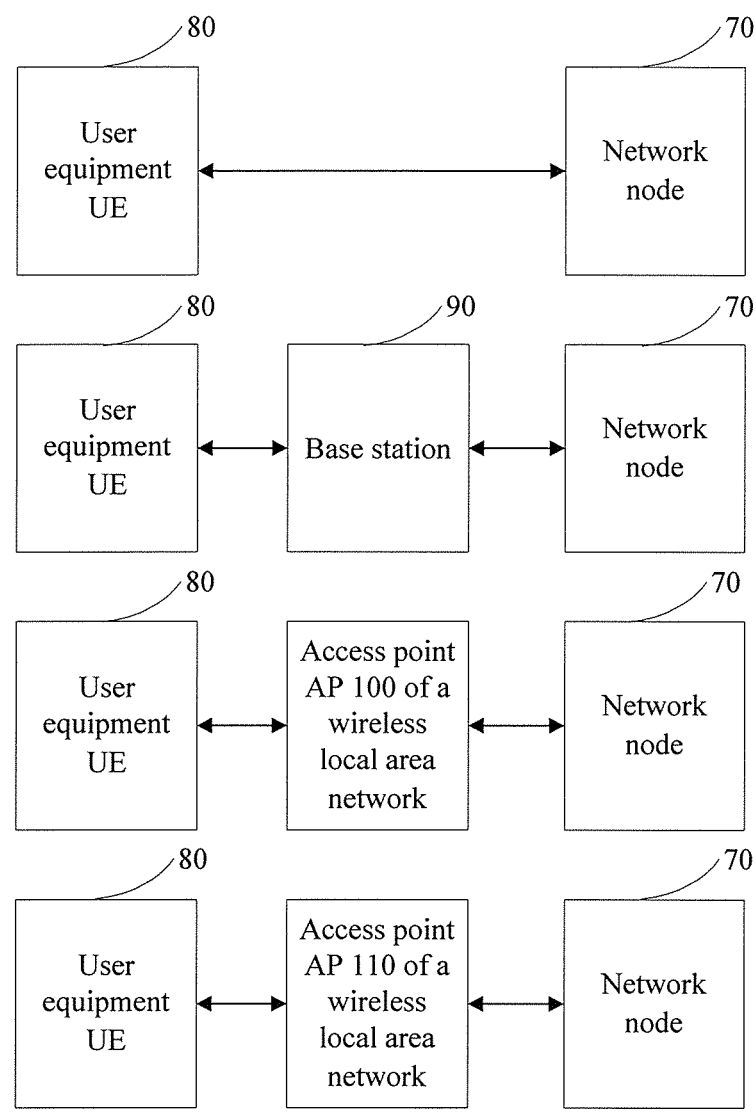
FIG. 12 is a schematic structural diagram of a communications system according to an embodiment of the present invention.

Referring to FIG. 12, an embodiment of the present invention provides a communications system, including:

the network node 70 and the user equipment UE 80 that are provided in the foregoing embodiments, where the network node 70 may be a base station; or the network node 70, the user equipment UE 80, and the base station 90 that are provided in the foregoing embodiments, where the network node 70 may be a network control node; or the network node 70, the user equipment UE 80, and the access point AP 100 of the wireless local area network that are provided in the foregoing embodiments, where the network node 70 may be a network control node, and may also be a base station; or the network node 70, the user equipment UE 80, and the access point AP 110 of the wireless local area network that are provided in the foregoing embodiments, where the network node 70 may be a network control node, and may also be a base station.

By using the device and system in embodiments shown in FIG. 7 to FIG. 12, the foregoing wireless local area network discovery method can be implemented, and whether the other UE is located within coverage of the AP is determined. If it is determined that the second UE is located within the coverage of the AP, the network node may instruct, when it is necessary, the second UE to accurately access the AP. For example, when the second UE performs packet data transmission, or a data volume for packet transmission performed by the second UE reaches a specific threshold, the network node instructs the second UE to accurately access the AP, thereby saving battery power of the UE, and improving user experience.

Figure 13:
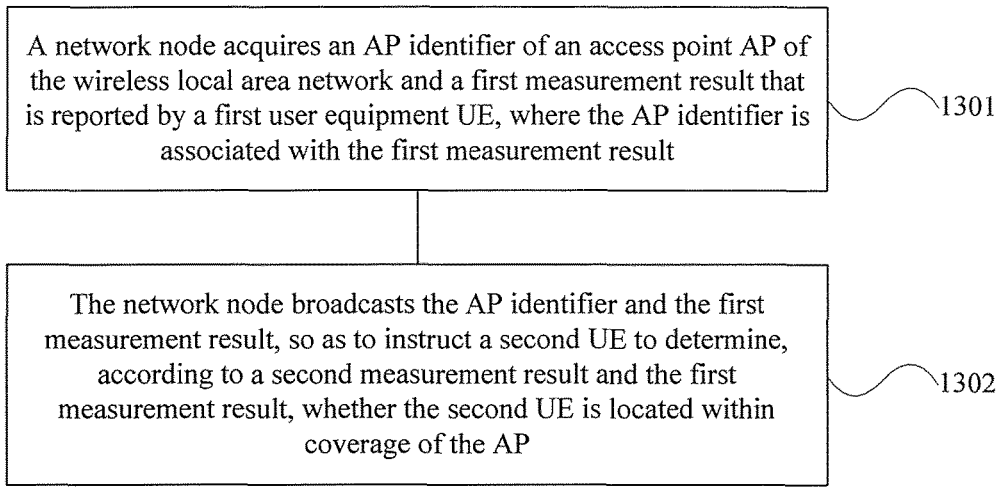
FIG. 13 is a schematic flowchart of a wireless local area network discovery method according to an embodiment of the present invention.

Referring to FIG. 13, an embodiment of the present invention provides a wireless local area network discovery method, including:

Step 1301. A network node acquires an AP identifier of an access point AP of a wireless local area network and a first measurement result that is reported by a first user equipment UE, where the AP identifier is associated with the first measurement result.

Optionally, step 1301 may further include:

acquiring, by the network node, connection establishment time, which is reported by the AP, of the first UE and the AP;

acquiring, by the network node, reporting time of the first measurement result; and if a time difference between the connection establishment time and the reporting time is less than a preset delay threshold, determining that the AP identifier is associated with the first measurement result.

Step 1301 is the same as step 101 in the embodiment shown in FIG. 1, and for detailed content, refer to the description in step 101, which is not repeatedly described herein.

Step 1302. The network node broadcasts the AP identifier and the first measurement result, so as to instruct a second UE to determine, according to a second measurement result and the first measurement result, whether the second UE is located within coverage of the AP.

In step 1302, when the network node is a base station, the base station may directly broadcast the AP identifier and the first measurement result; and when the network node is a network control node, the network control node may first forward the AP identifier and the first measurement result to a base station connected to the network control node, and then the base station broadcasts the AP identifier and the first measurement result.

For a specific process in which the second UE determines, according to the second measurement result and the first measurement result, whether the second UE is located within the coverage of the AP, refer to the description of embodiments in FIG. 1 and FIG. 2, which is not repeatedly described herein.

Figure 14:
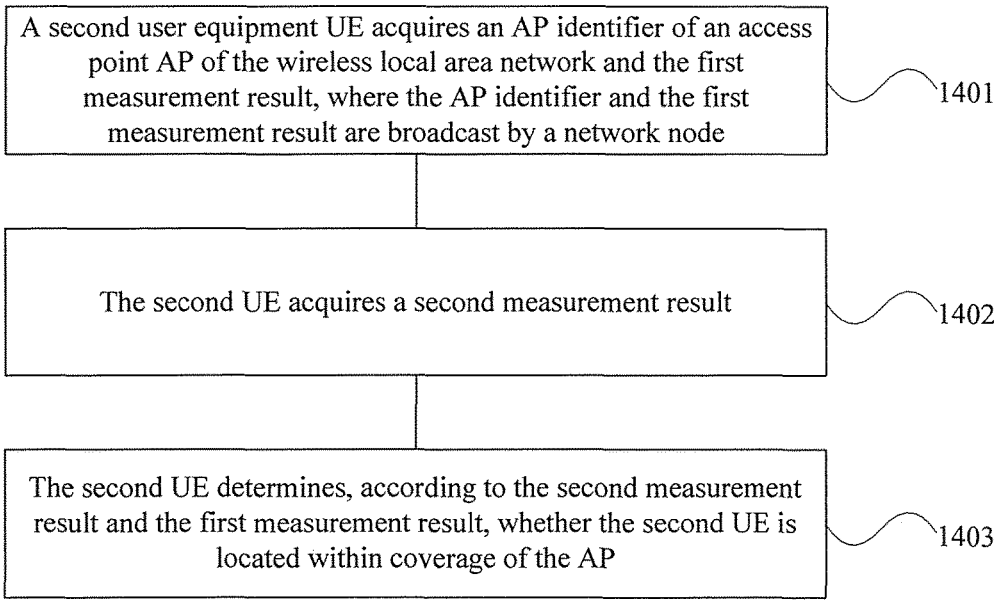
FIG. 14 is a schematic flowchart of a wireless local area network discovery method according to an embodiment of the present invention.

Referring to FIG. 14, an embodiment of the present invention provides still another wireless local area network discovery method, including:

Step 1401. A second user equipment UE acquires an AP identifier of an access point AP of a wireless local area network and a first measurement result, where the AP identifier and the first measurement result are broadcast by a network node, and the AP identifier is associated with the first measurement result.

Step 1402. The second UE acquires a second measurement result.

Step 1403. The second UE determines, according to the second measurement result and the first measurement result, whether the second UE is located within coverage of the AP.

Detailed content of step 1403 is the same as that of step 103 in the embodiment shown in FIG. 1, for detailed content, refer to the description in step 103, and for a determining process, refer to content in the embodiment shown in FIG. 2, which are not repeatedly described herein.

A main difference between the wireless local area network discovery method according to this embodiment and the wireless local area network discovery method according to the embodiment shown in FIG. 13 lies in that: a technical solution is described from a user equipment side in this embodiment, and the technical solution is described from a network device side in the embodiment shown in FIG. 13. In this embodiment, the second UE is required to execute step 1401 for at least one time before executing step 1403, so as to acquire at least one first measurement result associated with the AP identifier, and is also required to execute step 1402 for at least one time, so as to acquire at least one second measurement result. However, an execution sequence of step 1401 and step 1402 is not limited, and the number of executions of step 1401, step 1402, and step 1403 is also not limited. For a specific determining process, refer to description of embodiments in FIG. 1 and FIG. 2, which is not repeatedly described herein.

Compared with that the network node determines whether the second UE is located within the coverage of the AP in method embodiments shown in FIG. 1 to FIG. 6, by using technical solutions provided in embodiments shown in FIG. 13 and FIG. 14, the second UE may determine, according to the second measurement result and the first measurement result, whether the second UE is located within the coverage of the AP without waiting for an instruction of the network node, which improves autonomy of the second UE in a process for discovering a wireless local area network.

Figure 15:
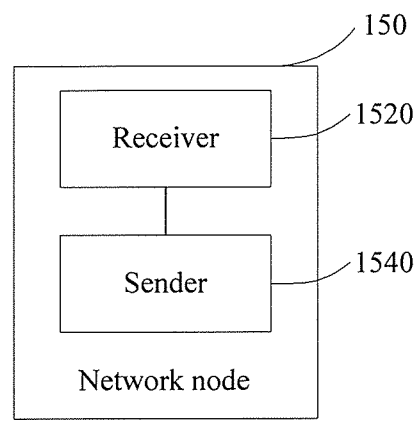
FIG. 15 is a schematic structural diagram of a network node according to an embodiment of the present invention.

Referring to FIG. 15, the present invention provides a network node 150, including:

a receiver 1520, configured to receive an AP identifier of an access point AP of a wireless local area network and a first measurement result that is reported by a first user equipment UE, where the AP identifier is associated with the first measurement result; and a sender 1540, configured to broadcast the AP identifier and the first measurement result, so that a second UE determines, according to a second measurement result and the first measurement result, whether the second UE is located within coverage of the AP.

Optionally, the receiver 1520 in the network node 150 may be further configured to receive connection establishment time, which is sent by the AP, of the first UE and the AP. The processor 1540 may be further configured to acquire reporting time of the first measurement result, where the reporting time is used to be compared with the connection establishment time; and if a time difference between the connection establishment time and the reporting time is less than a preset delay threshold, determine that the AP identifier is associated with the first measurement result.

The network node 150 can be applied to method embodiments shown in FIG. 13 and FIG. 14; and for specific description, refer to the foregoing method embodiments, which is not repeatedly described herein.

Figure 16:
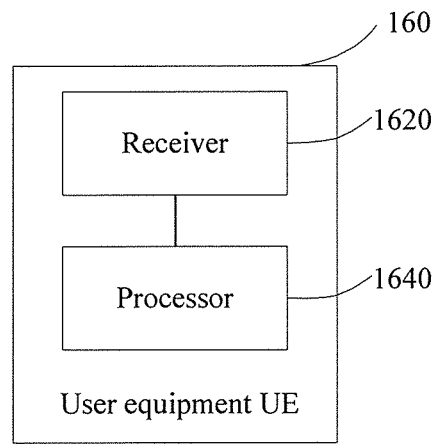
FIG. 16 is a schematic structural diagram of a user equipment UE according to an embodiment of the present invention.

Referring to FIG. 16, the present invention provides a user equipment UE 160, including:

a receiver 1620, configured to receive an AP identifier of an access point AP of a wireless local area network and a first measurement result, where the AP identifier and the first measurement result are broadcast by a network node, and the AP identifier is associated with the first measurement result; and a processor 1640, configured to acquire a second measurement result, and determine, according to the second measurement result and the first measurement result, whether the second UE is located within coverage of the AP.

The user equipment UE 160 can be applied to the method embodiments shown in FIG. 13 and FIG. 14; and for specific description, refer to the foregoing method embodiments, which is not repeatedly described herein.

Figure 17:
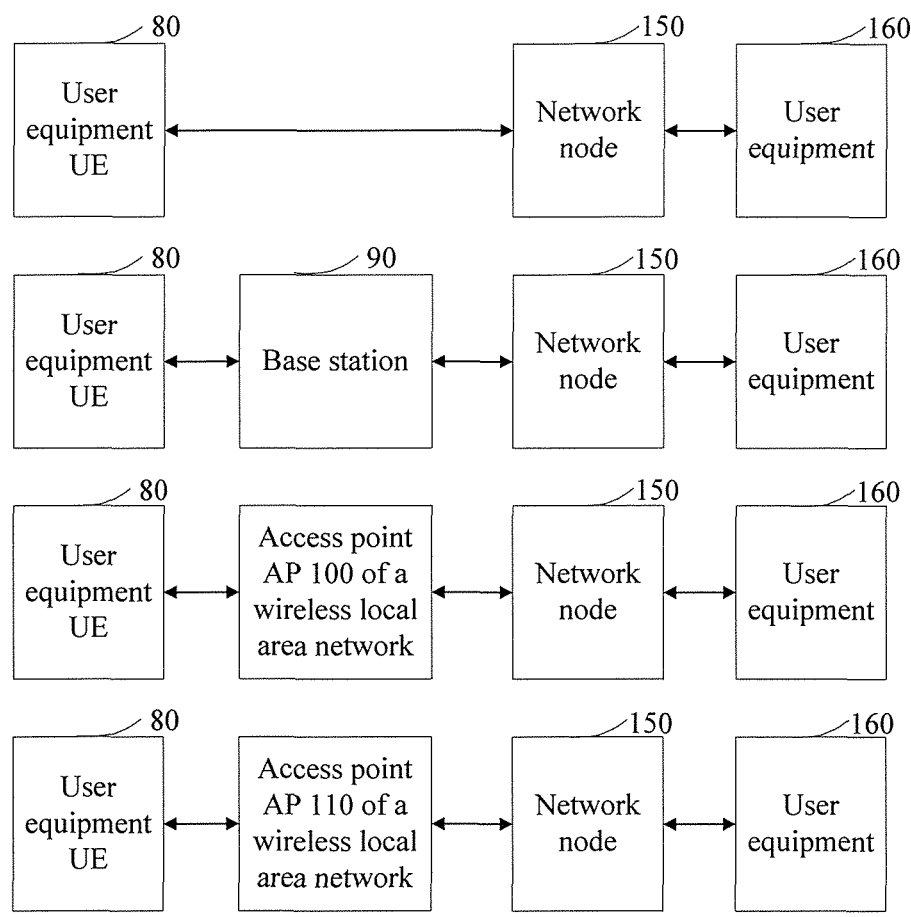
FIG. 17 is a schematic structural diagram of a communications system according to an embodiment of the present invention.

Referring to FIG. 17, an embodiment of the present invention provides a communications system, including:

the user equipment UE 80, the network node 150, and the user equipment UE 160 that are provided in the foregoing embodiments, where the network node 150 may be a base station; or the user equipment UE 80, the base station 90, the network node 150, and the user equipment UE 160 that are provided in the foregoing embodiments, where the network node 150 may be a network control node; or the user equipment UE 80, the access point AP 100 of the wireless local area network, the network node 150, and the user equipment UE 160 that are provided in the foregoing embodiments, where the network node 150 may be a network control node, and may also be a base station; or the access point AP 110 of the wireless local area network, the network node 150, and the user equipment UE 160 that are provided in the foregoing embodiments, where the network node 150 may be a network control node, and may also be a base station.

By using the device and system in embodiments shown in FIG. 15 to FIG. 17, the wireless local area network discovery method shown in FIG. 13 and FIG. 14 can be implemented. Compared with the prior art, by using the device and system in the embodiments shown in FIG. 15 to FIG. 17, the second UE may determine, by means of assistance of a network node, whether the second UE is located within the coverage of the AP, so as to accurately access the AP. Therefore, autonomy of a user equipment UE during discovery of a wireless local area network is improved, and battery power of the UE can also be saved.

A person skilled in the art can understand that various illustrative logical blocks and steps that are listed in the embodiments of the present invention may be implemented by using electronic hardware, computer software, or a combination thereof. To clearly display the interchangeability between the hardware and the software, functions of the foregoing various illustrative components and steps have been generally described. Whether the functions are implemented by using hardware or software depends on particular applications and a design requirement of the entire system. A person skilled in the art may use various methods to implement the functions for each particular application, but it should not be considered that such implementation goes beyond the protection scope of the embodiments of the present invention.

The various illustrative logical blocks, modules, and circuits described in the embodiments of the present invention may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general processor may be a microprocessor. Optionally, the general processor may also be any traditional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in the embodiments of the present invention may be directly embedded into hardware, a software module executed by a processor, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. Exemplarily, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in a user terminal. Alternatively, the processor and the storage medium may also be arranged in different components of the user terminal.

In one or more exemplary designs, the functions described in the embodiments of the present invention may be implemented by using hardware, software, firmware, or any combination thereof. If the present invention is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disc and the disk include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in the present invention, technologies in the art may use or implement the content of the present invention. Any modification based on the disclosed content shall be considered obvious in the art. The basic principles described in the present invention may be applied to other variations without departing from the essence and scope of the present invention. Therefore, the content disclosed in the present invention is not limited to the described embodiments and designs but may also be extended to a maximum scope that is consistent with the principles and disclosed new features of the present invention.

What is claimed is:

1. A wireless local area network discovery method, comprising:
   acquiring, by a network node, an access point (AP) identifier of an AP of a wireless local area network and a first measurement result that is reported by a first user equipment (UE), wherein the AP identifier is associated with the first measurement result;
   acquiring, by the network node, a second measurement result reported by a second UE;
   determining, by the network node according to the first measurement result and the second measurement result, whether the second UE is located within coverage of the AP; and
   determining, by the network node, that the AP identifier is associated with the first measurement result, comprising,
      acquiring, by the network node, connection establishment time, which is reported by the AP, of the first UE and the AP,
      acquiring, by the network node, reporting time of the first measurement result, and
      when a time difference between the connection establishment time and the reporting time is less than a preset delay threshold, determining that the AP identifier is associated with the first measurement result.

2. The method according to claim 1, wherein:
   the network node is a base station; and
   acquiring, by the base station, the AP identifier and the first measurement result comprises:
      receiving, by the base station, the AP identifier and the first measurement result that are directly sent by the first UE to the base station, or
      receiving, by the base station, the AP identifier and the first measurement result that are sent by the first UE and forwarded by the AP.

3. The method according to claim 1, wherein:
   the network node is a network control node; and
   acquiring, by the network control node, the AP identifier and the first measurement result comprises:
      receiving, by the network control node, the AP identifier and the first measurement result that are sent by the first UE and forwarded by a base station, or
      receiving, by the network control node, the AP identifier and the first measurement result that are sent by the first UE and forwarded by the AP.

4. The method according to claim 1, wherein:
   the AP identifier and the first measurement result acquired by the network node are comprised in a same measurement report reported by the first UE; or
   the AP identifier and the first measurement result are separately comprised in different measurement reports reported by the first UE.

5. The method according to claim 1, wherein determining, by the network node according to the first measurement result and the second measurement result, whether the second UE is located within coverage of the AP comprises:
   when a processing result of the second measurement result and the first measurement result is less than a preset error threshold, determining that the second UE is located within the coverage of the AP.

6. A wireless local area network discovery method, comprising:
   acquiring, by a network node, an access point (AP) identifier of an AP of a wireless local area network and a first measurement result that is reported by a first user equipment (UE), wherein the AP identifier is associated with the first measurement result;
   acquiring, by the network node, a second measurement result reported by a second UE;
   determining, by the network node according to the first measurement result and the second measurement result, whether the second UE is located within coverage of the AP;
   wherein there are multiple first measurement results, the method further comprising:
   determining, according to a minimum value and a maximum value in the multiple first measurement results, a value range of the first measurement result associated with the AP identifier;
   when the second measurement result falls within the value range, determining that the second UE is located within the coverage of the AP; and
   wherein determining, according to a minimum value and a maximum value in the multiple first measurement results, a value range associated with the AP identifier comprises:
      setting the minimum value as a lower limit of the value range, and setting the maximum value as an upper limit of the value range, or
      setting a result obtained by subtracting an error threshold from the minimum value as a lower limit of the value range, and setting a result obtained by adding the error threshold to the maximum value as an upper limit of the value range.

7. A network node, comprising:
   a receiver, configured to receive an access point (AP) identifier of an AP of a wireless local area network, a first measurement result of a first user equipment (UE), and a second measurement result of a second UE, wherein the AP identifier is associated with the first measurement result;
   a processor, configured to determine, according to the first measurement result and the second measurement result, whether the second UE is located within coverage of the AP;
   wherein the receiver is further configured to receive connection establishment time, which is sent by the AP, of the first UE and the AP; and
   wherein the processor is further configured to acquire reporting time of the first measurement result, wherein the reporting time is used to be compared with the connection establishment time; and if a time difference between the connection establishment time and the reporting time is less than a preset delay threshold, determine that the AP identifier is associated with the first measurement result.

8. A wireless local area network discovery method, comprising:

acquiring, by a second user equipment (UE), an access point (AP) identifier of an AP of a wireless local area network and a first measurement result of a first UE, wherein the AP identifier and the first measurement result are broadcast by a network node, and the AP identifier is associated with the first measurement result;

acquiring, by the second UE, a second measurement result;

determining, by the second UE according to the second measurement result and the first measurement result, whether the second UE is located within coverage of the AP;

determining, according to a minimum value and a maximum value in multiple first measurement results, a value range of the first measurement result associated with the AP identifier;

when the second measurement result falls within the value range, determining that the second UE is located within the coverage of the AP; and wherein determining, according to a minimum value and a maximum value in the multiple first measurement results, a value range associated with the AP identifier comprises:

setting the minimum value as a lower limit of the value range, and setting the maximum value as an upper limit of the value range, or setting a result obtained by subtracting an error threshold from the minimum value as a lower limit of the value range, and setting a result obtained by adding the error threshold to the maximum value as an upper limit of the value range.

9. The method according to claim 8, wherein determining, by the second UE according to the second measurement result and the first measurement result, whether the second UE is located within coverage of the AP comprises:

when a processing result of the second measurement result and the first measurement result is less than a preset error threshold, determining that the second UE is located within the coverage of the AP.

\* \* \* \* \*